(No Model.)
T. FOWLER.
SAW.
No. 328,019. Patented Oct. 13, 1885.
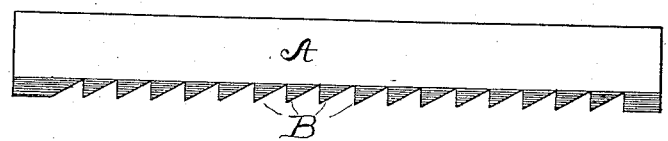
Witnesses
J. S. Williamson
W. J. Haviland
Inventor
Thaddeus Fowler
By Smith & Hubbard
Attys

UNITED STATES PATENT OFFICE.

THADDEUS FOWLER, OF BRIDGEPORT, ASSIGNOR TO HENRY G. THOMPSON, OF MILFORD, AND H. GRANT THOMPSON, OF NEW HAVEN, CONNECTICUT, AND ARTHUR G. THOMPSON, OF NEW YORK, N. Y.

SAW.

SPECIFICATION forming part of Letters Patent No. 328,019, dated October 13, 1885.

Application filed February 9, 1885. Serial No. 155,344. (No model.)

*To all whom it may concern:*

Be it known that I, THADDEUS FOWLER, a citizen of the United States, residing at Bridgeport, in the county of Fairfield and State of Connecticut, have invented certain new and useful Improvements in Saws; and I do hereby declare the following to be a full, clear, and exact description of the invention, such as will enable others skilled in the art to which it appertains to make and use the same.

My invention relates to certain novel and useful improvements in saws, but more especially to that class of saws used in cutting metal and other hard substances, and has for its object to furnish a saw which, while hard as to its teeth, so as to insure a durable cutting-edge, shall be of such temper as to its body as to prevent its breakage when subjected to sudden cross-strain or twist; and with these ends in view my invention consists in the article of manufacture hereinafter described, and then specifically designated by the claims.

In order that those skilled in the art to which my invention appertains may more fully understand its construction, I will proceed to describe the same in detail, referring by letter to the accompanying drawing, forming a part of this specification, and which shows a side elevation of a saw made in accordance with my improvement in the same.

A is the blade, having cut on the edge thereof the teeth B, as in ordinary saws. The blade is made from tough and pliable steel, upon which the teeth may be cut and set by any ordinary process. I then proceed to harden the teeth to a high temper down to their base-line or line of juncture with the body of the saw, taking care that the hard temper is confined to the teeth alone and does not extend at all into the body of the saw. This gives as a result a saw whose blade is so tough and pliable as not to be broken by any bending or twisting to which it may be subjected, and which at the same time is provided with teeth of greater hardness than can be practically given to an entire saw without its breaking when subjected to a short bend or twist.

The advantages gained by my invention are, that the tough back upon which are the very hard teeth enables the latter to be used until worn away, and without the danger of breakage to which a saw hardened throughout to an even temper with the cutting-teeth is constantly liable.

While I am able to so temper the blade that the temper-line may be at any point in the width of the blade, I preferably fix upon the base-line of the teeth as the best and most advantageous point.

Having thus described my invention, what I claim as new, and desire to secure by Letters Patent, is—

1. As a new article of manufacture, a saw as described, made from tough pliable steel, and having the teeth thereof hardened to a high temper down to their base-line or line of juncture with the body of the blade, substantially as described.

2. A saw, as described, of a single piece of metal with a soft back and high-tempered hard teeth, as specified.

In testimony whereof I affix my signature in presence of two witnesses.

THADDEUS FOWLER.

Witnesses:
S. S. WILLIAMSON,
W. J. HAVILAND.